United States Patent
Myers et al.

[11] Patent Number: 5,947,711
[45] Date of Patent: Sep. 7, 1999

[54] ROTARY SCREW AIR COMPRESSOR HAVING A SEPARATOR AND A COOLER FAN ASSEMBLY

[75] Inventors: Wayne K. Myers, Loraine; David C. Poole, Quincy, both of Ill.

[73] Assignee: Gardner Denver Machinery, Inc., Quincy, Ill.

[21] Appl. No.: 08/843,515

[22] Filed: Apr. 16, 1997

[51] Int. Cl.[6] ............. F04C 29/02; F04C 29/04; B01D 45/08

[52] U.S. Cl. .............. 418/85; 418/97; 418/101; 418/201.1; 418/DIG. 1; 55/342.2; 55/465; 165/140

[58] Field of Search ................ 418/85, 97, 100, 418/101, 201.1, DIG. 1; 55/342.1, 342.2, 465; 165/140

[56] References Cited

U.S. PATENT DOCUMENTS

| | | | |
|---|---|---|---|
| 3,291,385 | 12/1966 | Williams et al. | 418/85 |
| 4,249,596 | 2/1981 | Tutak et al. | 165/113 |
| 4,341,506 | 7/1982 | Klein | 418/DIG. 1 |
| 4,394,111 | 7/1983 | Wiese et al. | 417/360 |
| 4,420,293 | 12/1983 | Hofmann | 418/85 |
| 4,763,723 | 8/1988 | Granetzke | 165/67 |
| 4,929,161 | 5/1990 | Aoki et al. | 418/83 |
| 4,968,231 | 11/1990 | Zimmern et al. | 418/85 |
| 5,020,973 | 6/1991 | Lammers | 417/243 |
| 5,022,828 | 6/1991 | Myers | 417/362 |
| 5,087,178 | 2/1992 | Wells | 418/85 |
| 5,106,270 | 4/1992 | Goettel et al. | 417/243 |
| 5,199,858 | 4/1993 | Tsuboi et al. | 418/DIG. 1 |
| 5,219,016 | 6/1993 | Bolton et al. | 165/41 |
| 5,226,285 | 7/1993 | Dankowski | 165/97 |
| 5,259,206 | 11/1993 | Dankowski | 165/122 |
| 5,282,726 | 2/1994 | Warren | 417/243 |
| 5,287,916 | 2/1994 | Miller | 165/113 |
| 5,375,649 | 12/1994 | Nilsen et al. | 165/4 |
| 5,378,119 | 1/1995 | Goertzen | 417/313 |
| 5,447,422 | 9/1995 | Aoki et al. | 418/83 |
| 5,466,134 | 11/1995 | Shaffer et al. | 418/101 |

FOREIGN PATENT DOCUMENTS

| | | | |
|---|---|---|---|
| 6-249165 | 9/1994 | Japan | 418/101 |
| 1322395 | 7/1973 | United Kingdom | 165/135 |

OTHER PUBLICATIONS

Baniak, *Compressors–II*; Lubrication, vol. 59, Apr.–Jun. 1973; pp. 21, 28, 30.

*Primary Examiner*—John J. Vrablik
*Attorney, Agent, or Firm*—Lee, Mann, Smith, McWilliams, Sweeney & Ohlson

[57] ABSTRACT

A rotary-screw air compressor having a separator, a cooler fan assembly, and a mounting apparatus. The separator has a first chamber and a second chamber. The first chamber separates compressed air and coolant. The second chamber separates compressed air and moisture. The separator is disposed in a chasm formed by a first platform. The mounting apparatus elevates a motor and air end vertically above and spatially apart from the separator. A cooler fan assembly is vertically above the motor and air end. The cooler fan assembly has a first heat exchanger vertically above a second heat exchanger. A shroud having an opposite open end is connected to the first heat exchanger at one open end and the shroud is connected to the second heat exchanger at the other open end. A cooler fan is disposed completely within the shroud and between the first and second heat exchangers.

10 Claims, 6 Drawing Sheets

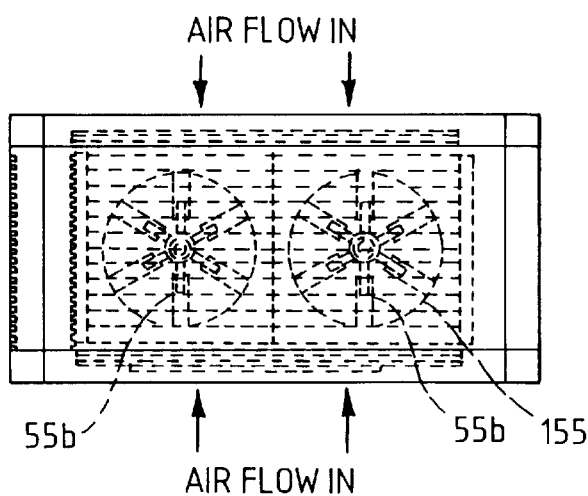
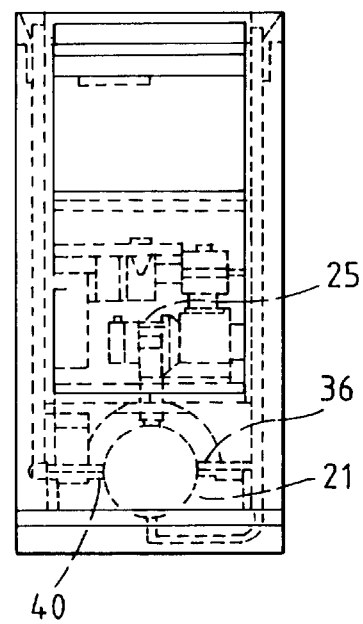
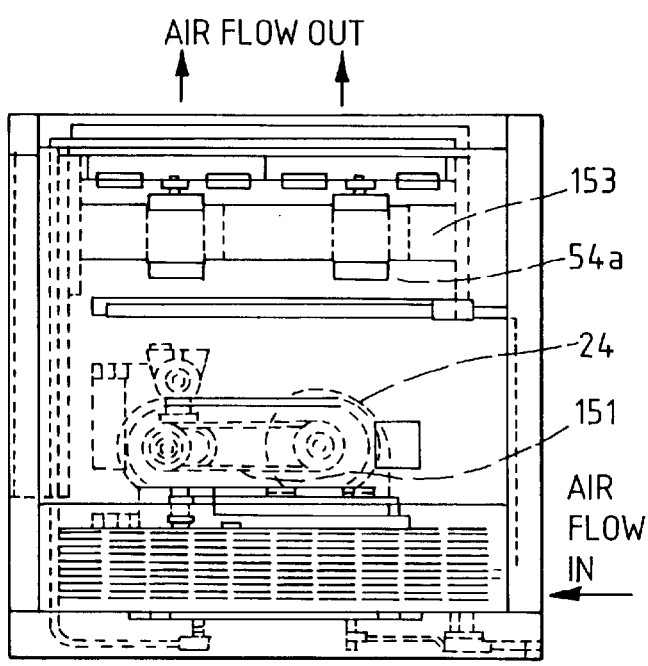
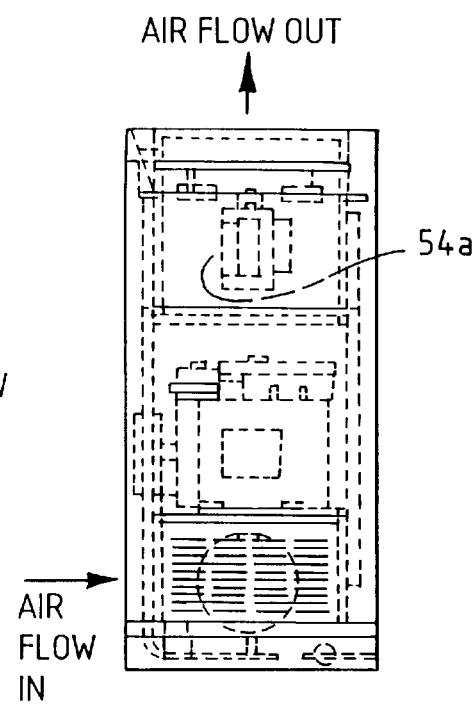

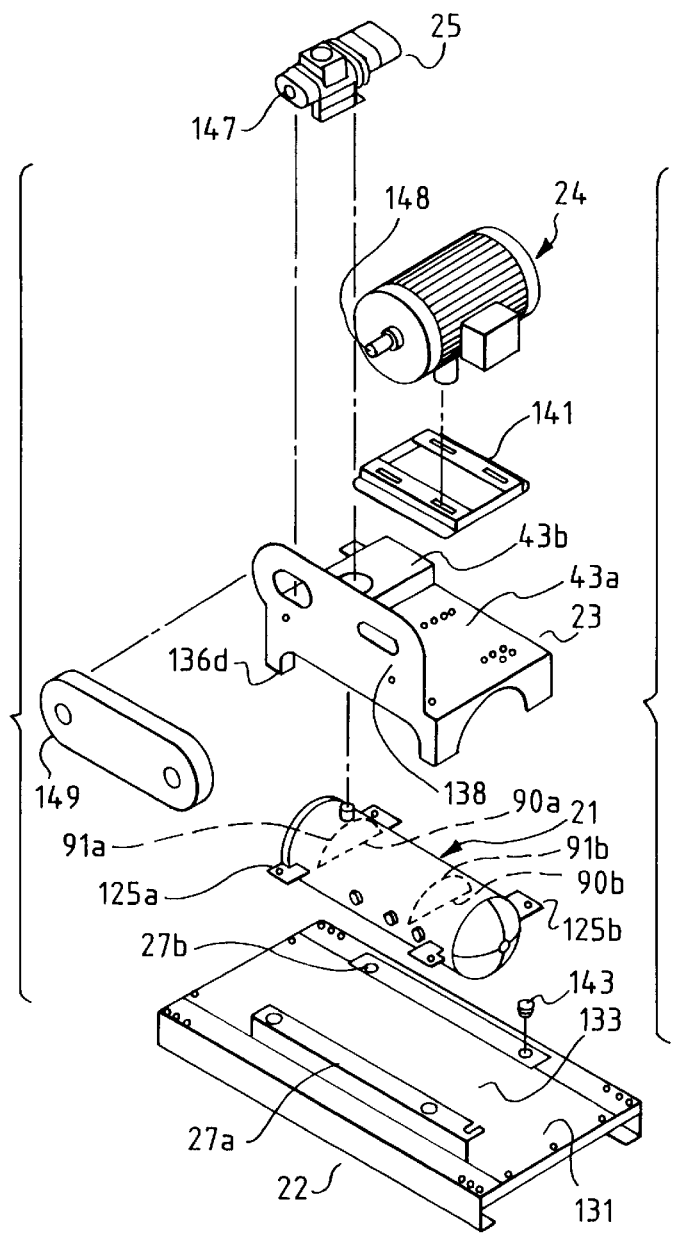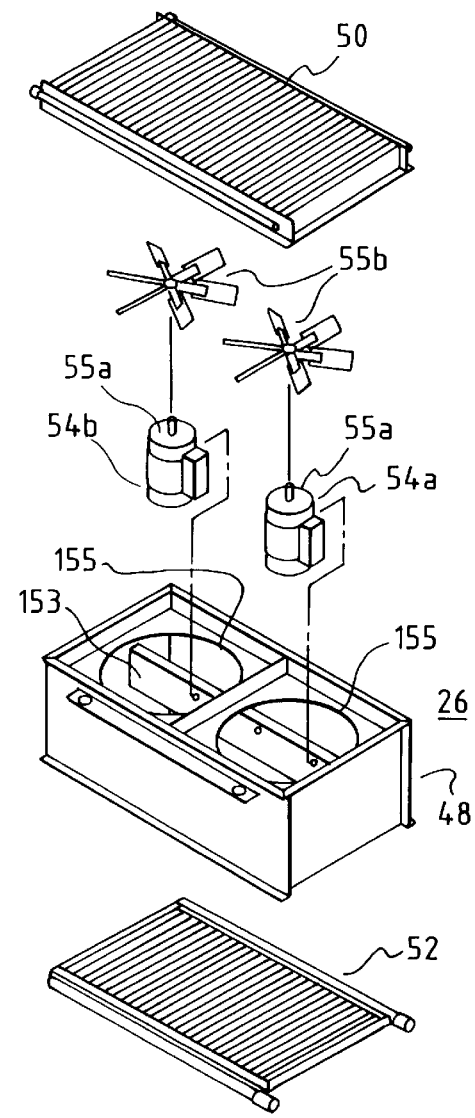

ROTARY SCREW AIR COMPRESSOR HAVING A SEPARATOR AND A COOLER FAN ASSEMBLY

FIELD OF THE INVENTION

This invention is directed to a rotary-screw air-compressor and more particularly to a rotary-screw air-compressor having an air end, a separator, and a mounting apparatus for the separator and air end.

BACKGROUND

Rotary-screw air-compressors are used to drive air-powered machines and tools. Rotary-screw air-compressors are known for their reliability, durability and ease of maintenance. The reliability, durability and ease of maintenance in large part come from the simplicity of the air end. The air end is the portion of the compressor which compresses the air, and generally utilizes a less complex assemblage of parts than reciprocating compressors.

U.S Pat. No. 5,199,858, Tsuboi, improves upon an oil-injected rotary-screw air-compressor by providing an oil tank having an L-shaped vertical section and a base portion. The L-shaped vertical section contains an oil separating element. A compressor body is mounted on the base portion of the oil tank. An air reservoir tank is formed unitarily with and below the oil tank.

The present invention seeks to improve upon previous rotary-screw air-compressors. The present invention seeks to reduce the floor space taken up by a rotary-screw air-compressor. The invention reduces floor space use by vertically stacking parts of the rotary-screw air-compressor.

The invention further desires to reduce the noise level and improve durability over previous rotary-screw air-compressors. The invention reduces noise level and improves durability by reducing the vibrational impact and the load the motor and air end have on various components of the compressor such as the separator.

The invention further reduces noise level by providing a cooler fan assembly which creates less operating noise than previous cooler fan assemblies.

The invention further desires to reduce the overall number of parts utilized in the rotary-screw air-compressor. The invention reduces the overall number of parts by providing a separator which eliminates the need for previously used moisture separating units.

The invention further improves the efficiency of the cooler fan assembly.

SUMMARY

Accordingly, in one embodiment of the invention, a water-injected rotary-screw air-compressor is provided with a first platform. A separator having a separator body is connected to the first platform. A second platform has a second platform support. The support is disposed vertically above the separator. An air end and a means to power said air end are disposed over the second platform support and connected to the second platform support. A means prevents the second platform support from producing a load on the separator body. The second platform is connected to the first platform.

In another embodiment of my water-injected rotary-screw air compressor, the first platform includes a first elevated surface and a second elevated surface. A chasm separates the first and second elevated surfaces. A portion of the separator body is disposed in the chasm. The separator body remains free of contact with the first platform.

In still a further embodiment of my invention, a water-injected rotary-screw air-compressor separator is provided with a separator body. An internal surface of the separator body defines a hollow. A partition divides the hollow into a first and a second chamber. A first baffle is disposed in the first chamber and a second baffle is disposed in the second chamber. A discharge inlet opens into the first chamber. The discharge inlet permits an amount of compressed air and an amount of coolant discharged from an air end to enter into the first chamber. A coolant outlet opens out of the first chamber. The coolant outlet permits the coolant to exit the first chamber. A compressed air outlet opens out of the first chamber. The compressed air outlet permits compressed air to leave the first chamber.

A compressed air inlet opens into the second chamber. The compressed air inlet permits compressed air from the first chamber to enter the second chamber. A compressed air discharge outlet opens out of the second chamber. A moisture outlet opens out of the second chamber.

In still another embodiment of my invention, a water-injected rotary-screw air-compressor cooler fan assembly is provided with a shroud. The shroud has a first end and an opposite second end. The shroud defines an air passage. The air passage has a constriction. A coolant cooling heat exchanger is connected to the shroud. A compressed air cooling heat exchanger (aftercooler) is connected to the shroud. The coolant cooling heat exchanger and aftercooler are opposite each other. A pair of cooler fans are disposed completely within the shroud and between the aftercooler and coolant cooling heat exchanger.

Other desires, results and novel features of the present invention will become more apparent from the following drawings, detailed description and the accompanying claims.

BRIEF DESCRIPTION OF THE DRAWINGS

FIG. 2 is a top view looking down into the water-injected rotary-screw air-compressor;

FIG. 3 is a first end view of the water-injected rotary-screw air-compressor showing the air end connected to the separator body;

FIG. 4 is a side view of the water-injected rotary-screw air-compressor showing the pair of cooler fans;

FIG. 5 is a second end view of the water-injected rotary-screw air-compressor opposite the first end view and looks into the compressor motor;

FIG. 8 is an exploded view of the mounting apparatus used in conjunction with the separator, motor and air end;

FIG. 9 is an exploded view of the cooler fan assembly;

DETAILED DESCRIPTION

Figure 1:
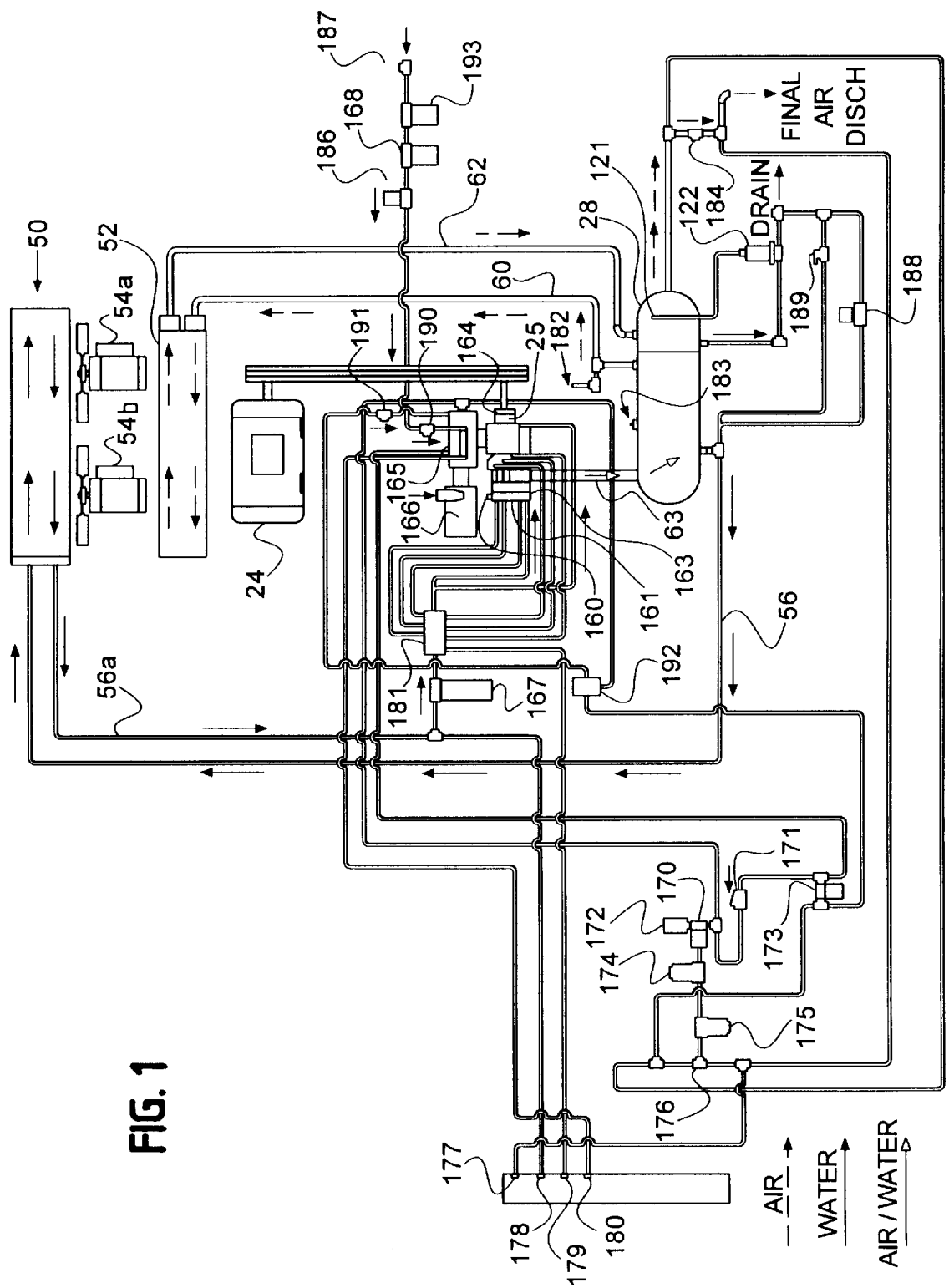
FIG. 1 is a schematic of the water-injected rotary-screw air-compressor.

Referring to FIGS. 8 and 9, my water-injected rotary-screw air-compressor includes a separator 21 mounted between a first platform 22 and a second platform 23; a motor 24 and air end 25 are mounted above the second platform and connected thereto. A cooler fan assembly 26 is mounted vertically over the motor and air end.

In more detail, the separator 21 is connected to an elevated surface 27a, 27b of the first platform. The elevated surface forms a first elevated surface 27a and a second elevated surface 27b.

Now referring to FIGS. 10, 10a, 11, 11a and 12, the separator has a separator body 28. The separator body has an internal surface 30a, 30b, 30c which defines a hollow 32a, 32b. The hollow is divided into a first chamber 32a and a second chamber 32b. A discharge inlet 34 is connected to the first chamber. The inlet receives compressed air and coolant discharged from the air end. A compressed air outlet 36 is connected to the first chamber and a coolant outlet 38 is also connected to the first chamber.

A compressed air inlet 40 is connected to the second chamber and a compressed air discharge outlet 42 is connected to the second chamber.

Again referring to FIGS. 6, 8, and 9, the second platform 23 has a second platform support 43a, 43b. The second platform support 43a, 43b is disposed vertically above the separator body and spaced apart therefrom. The air end and motor are disposed over the second platform support 43a, 43b and connected thereto. The second platform 23 is connected to the first platform.

The cooler fan assembly 26 is disposed vertically above the air end 25 and motor 24 and spaced apart therefrom. The cooler fan assembly includes a shroud 48, a first heat exchanger 50 and a second heat exchanger 52. The heat exchangers are disposed at axially opposite ends of the shroud. A pair of cooler fans 54a, 54b are disposed within the shroud and are axially between the first and second heat exchangers (see FIG. 4). Each cooler fan has a fan motor 55a and a fan blade 55b. The first exchanger 50 is vertically above the second heat exchanger 52.

Now also referring to FIG. 1, a duct 56 connects the first heat exchanger to the coolant outlet 38. A duct 56a also connects the first heat exchanger to the air end 25.

A duct 60 connects the second heat exchanger to the compressed air outlet. A duct 62 also connects the second heat exchanger to the compressed air inlet.

During operation, coolant and compressed air are discharged from the air end 25. The discharged coolant and compressed air pass through the discharge inlet 34 and into the first chamber 32a of the separator. While in the first chamber, the coolant and the compressed air are separated.

The coolant outlet 38 allows the coolant to exit the first chamber. The duct 56 directs the coolant from the coolant outlet to the first heat exchanger. The first heat exchanger 50 reduces the coolant's temperature. The duct 56a then directs the coolant from the first heat exchanger back into the air end. The coolant is recirculated by being discharged back into the separator through a duct 63.

The compressed air outlet 36 permits the compressed air to leave the first chamber of the separator. The duct 60 directs the compressed air from the compressed air outlet to the second heat exchanger 52. The second heat exchanger reduces the temperature of the compressed air.

The duct 62 directs the compressed air from the second heat exchanger to the compressed air inlet 40. The compressed air passes through the compressed air inlet 40 and into the second chamber 32b of the separator. In the second chamber, moisture is removed from the compressed air. Cool, dry compressed air is then discharged from the second chamber through the compressed air discharge outlet 42.

In the shown embodiment, the coolant is water. The first heat exchanger 50 is a coolant cooling heat exchanger, and more particularly a water cooler, and the second heat exchanger 52 is an aftercooler.

Referring to FIGS. 10, 10a, 11, 11a and 12 in still more detail, the separator body has two conical ends. The first conical end 64 is at one end of the separator body's longitudinal length; the second conical end 65 is at the opposite end of the separator body's longitudinal length. The hollow 32a, 32b has a longitudinal length 67 of about 42 inches.

The internal surface 30a, 30b, 30c includes a plurality of internal concave surfaces. A first internal concave surface 30a forms the internal surface of the first conical end, and a second internal concave surface 30b forms the internal surface of the second conical end. The portion of the internal surface connecting the concave surfaces is annular. The internal annular surface 30c forms a cylinder having an internal diameter 75 of about 0.28 times the longitudinal length 67 of the hollow.

A partition 77 divides the hollow 32a, 32b into the first chamber 32a and the second chamber 32b. The first chamber is adjacent to the first conical end and the second chamber is adjacent to the second conical end. The partition separates the two chambers and is constructed to prevent compressed air from one chamber entering into the other chamber. The partition isolates and seals off the environments of the first and second chambers from one another.

The partition 77 is a bulkhead that is preferably perpendicular to a longitudinal axis 79 of the hollow. The bulkhead lies in a cross-sectional plane transverse to the longitudinal length of the hollow. The bulkhead has a longitudinal distance of about 28 inches from the focal point 81 of the first internal concave surface.

Figure 11:
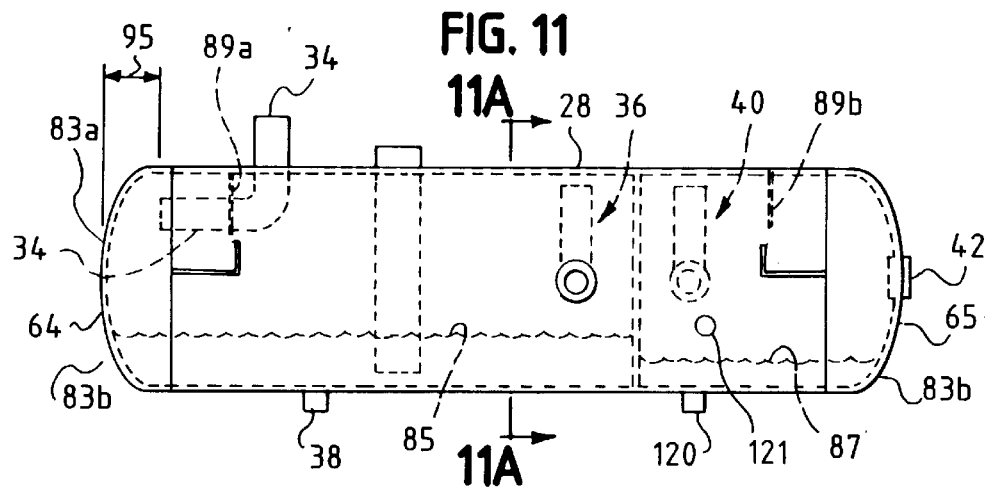
FIG. 11 is a side view of the separator looking into the compressed air outlet.
Figure 11A:
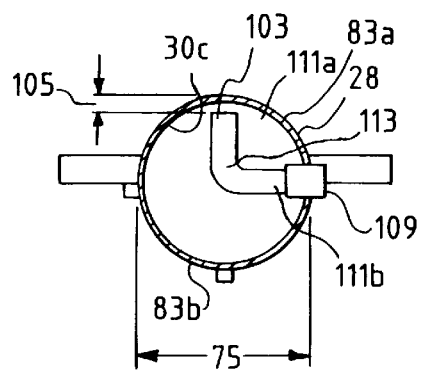
FIG. 11a is a sectional view of the separator taken along view line 11a—11a of FIG. 11.
Figure 12:
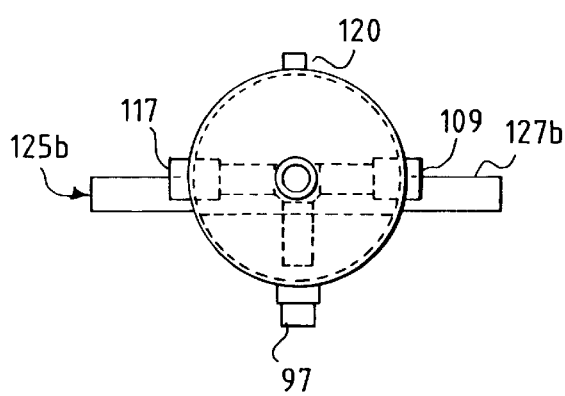
FIG. 12 is an end view of the separator looking into the second end of the separator body.
Figure 13:
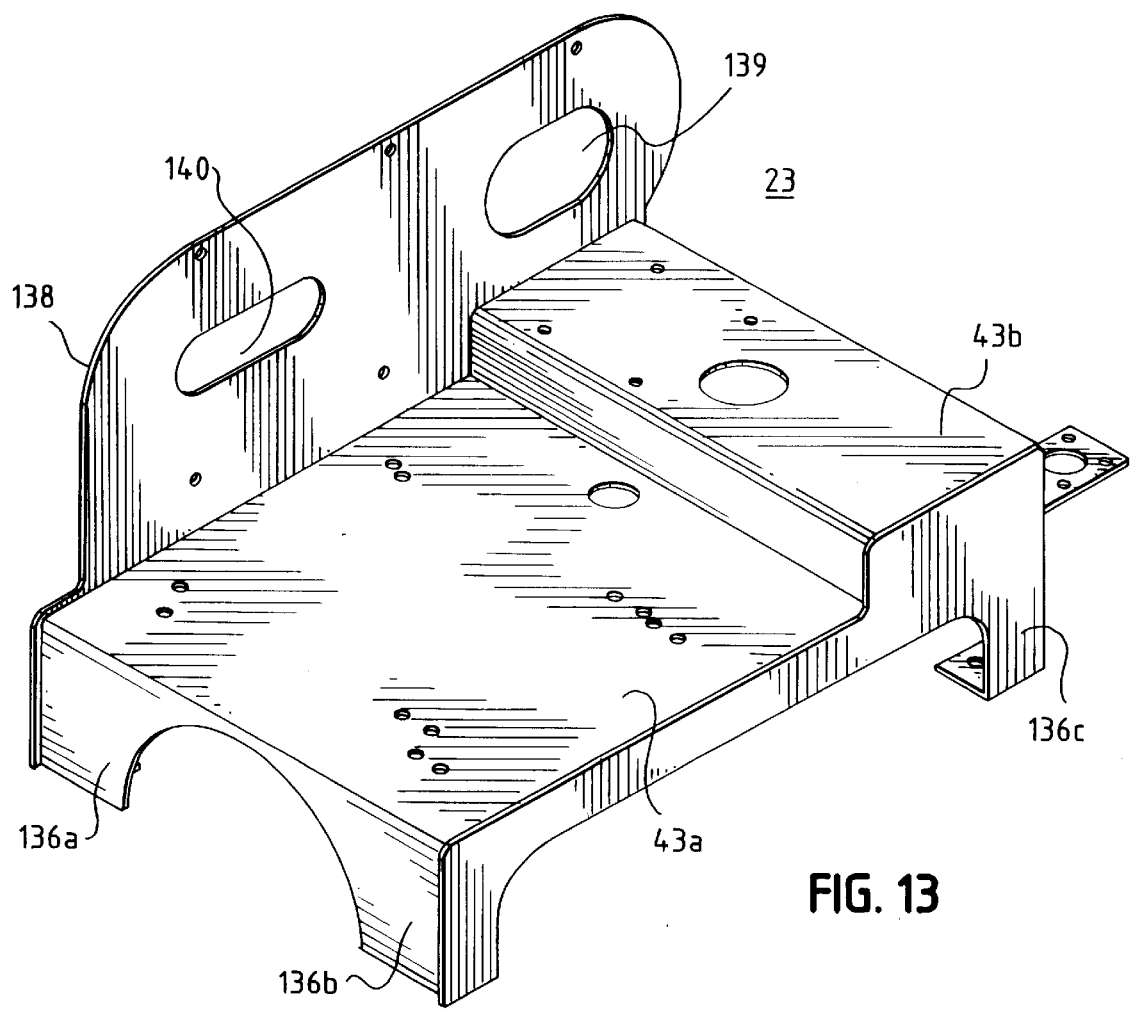
FIG. 13 is a side top perspective view of the second platform of the mounting apparatus.

The separator body 28 has a first longitudinal section 83a and a second longitudinal section 83b (see FIG.11). The first and second sections are on opposite sides of a cross-sectional plane taken along the longitudinal axis 79 of the hollow. The coolant 85 collects on a portion of the internal surface in the second longitudinal section and in the first chamber. The moisture 87 from the cooled air collects on a portion of the internal surface in the second longitudinal section 83b and in the second chamber 32b.

Baffle 89a is disposed in the first chamber, and baffle 89b is disposed in the second chamber; each baffle extends axially away from the internal annular surface of the first longitudinal section and towards the internal annular surface of the second longitudinal section.

Each baffle lies in a cross-sectional plane transverse to the longitudinal length of the hollow. Each baffle is at a right angle to the longitudinal axis 79 of the hollow.

Each baffle has a linear edge 90a, 90b and a curved edge 91a, 91b (see FIG. 8). The curved edge is opposite the linear edge. The linear edge has ends which form the ends of the curved edge. The linear edge has a length about equal to 0.9 of the internal diameter of the cylinder. The arc of the curved edge is the same as the arc of the internal annular surface 30c. The curved edge is integral with the internal annular surface 30c. Each baffle forms a sort of half-moon shape.

The baffle disposed in the first chamber is first baffle 89a and has a longitudinal distance 92 from the focal point 81 of the first internal concave surface of about 7 inches. The baffle in the second chamber is second baffle 89b. The second baffle 89b has a longitudinal distance of about 7 inches to the bulkhead.

The discharge inlet 34 includes an exit 93. The exit is disposed in the first chamber and is disposed in the first longitudinal section. The exit opens towards the first internal concave surface 30a. The exit is between the first baffle and the first internal concave surface 30a. The exit has a distance 95 of about 3 inches to the first internal concave surface 69.

The discharge inlet 34 has an entrance 97 opening into the first longitudinal section and the first chamber. The entrance opens through the internal annular surface.

The discharge inlet directs the coolant and compressed air discharge in a flow direction in the first chamber. A tube 101 connects the exit and the entrance to define the flow direction. The tube passes through the first baffle.

The flow direction includes a first 99a and second 99b flow direction. The first flow direction 99a flows from the internal annular surface of the first longitudinal section towards the second longitudinal section.

The second flow direction 99b is along the longitudinal length of the hollow and flows away from the second conical end and towards the first conical end.

The coolant outlet 38 opens out of the first chamber and through the internal annular surface of the second longitudinal section. The coolant outlet is connected to the water cooler 50.

The compressed air outlet 36 has an entrance 103 disposed in the first longitudinal section and the first chamber. The entrance opens towards the annular surface of the first longitudinal section. The entrance has a distance 105 to the internal annular surface of about 1 inch. The entrance has a distance 107 of about 3 inches to the bulkhead and a distance to the first baffle of about 18 inches. The entrance is between the first baffle and the bulkhead.

The compressed air outlet has an exit 109. The exit opens out of the first chamber and through the internal annular surface.

The compressed air outlet directs the compressed air in a flow direction in the first chamber. A tube 113 connects the entrance and exit to define the flow direction. The flow direction includes a first 111a and second 111b flow direction. The first flow direction 111a is transverse to the longitudinal length of the hollow and flows in a direction away from the first longitudinal section and towards the second longitudinal section. The second flow direction 111b is transverse to the longitudinal length of the hollow. It flows from the interior of the hollow towards the interior annular surface.

The compressed air inlet has an exit 116 and an entrance 117. The entrance 117 opens into the second chamber and through the internal annular surface. The exit 116 of the compressed air inlet is disposed in the second chamber. The exit 116 is disposed in the first longitudinal section 83a. The exit opens towards the internal annular surface. The exit has a distance of about 1 inch to this internal annular surface. It has a distance of about 4 inches to the second baffle. It is disposed between the second baffle 89b and the bulkhead 77.

The compressed air inlet directs the compressed air in a flow direction in the second chamber. A tube 119 connects the exit and entrance to define the flow direction. The flow direction includes a first and second flow direction. The first flow direction 118a is transverse to the longitudinal length of the hollow and flows away from the annular internal surface and towards the interior of the hollow. The second flow direction 118b is transverse to the longitudinal length of the hollow and flows away from the second longitudinal section and towards the first longitudinal section.

The compressed air discharge outlet 42 opens out of the second chamber. The compressed air discharge outlet opens through the second internal concave surface.

A moisture outlet 120 opens out of the second longitudinal section and the second chamber. The outlet opens through the internal annular surface.

A vent 121 opens through the second chamber. Vent 121 vents the moisture trap 122 (see FIG. 1).

A separator level switch 123 is disposed in the first chamber. The switch extends from the first longitudinal section towards the second longitudinal section. The level switch detects when a low level of coolant is circulating through the rotary-screw compressor.

A support 125a, 125b is connected to the separator body. The support is a pair of metal straps. A metal strap 125a is towards the first conical end. A metal strap 125b is towards the second conical end. The central portion of each metal strap wraps around the second longitudinal section 83b of the separator body. The ends of each metal strap form flanges. Metal strap 125a has a first flange 126a and a second flange 126b. The first flange 126a is disposed on a side of the separator opposite to the disposition of the second flange 126b.

A third 126c and fourth 126d flange form the ends of metal strap 125b in the same manner as the first and second flanges form the ends of metal strap 125a, excepting the third and fourth flanges are towards the second conical end 65. The first, second, third and fourth flanges are disposed in the same plane.

Each flange has a first side 127a and an opposite second side 127b.

The elevated surface 27a, 27b of the first platform is vertically spaced from and in a different horizontal plane than a lower surface 131 of the first platform. The first 27a and second 27b elevated surfaces are horizontally spaced apart from each other. A chasm 133 separates the first and second elevated surfaces.

The chasm 133 has a horizontal width to accommodate the transverse length of the separator body. The chasm accommodates at least a portion of the second longitudinal section of the separator body.

The second platform support 43a, 43b has a first level 43a and a second level 43b. The second platform has four legs 136a, 136b, 136c, 136d.

A back 138 forms part of the second platform. The back has a first opening 139 and a second opening 140. The first opening is laterally spaced from the second opening.

A plate 141 is disposed over and connected to the second platform support.

Referring to FIG. 8, the flanges connect the separator body 28 to the first 27a and second 27b elevated surfaces of the first platform 22. The second side 127b of each flange faces towards the first 27a and second 27b elevated surfaces of the first platform. An isolator 143 is disposed between the second side 127b of each flange and the elevated surfaces 27a, 27b of the first platform. The second longitudinal section 83b of the separator body is disposed in the chasm (see FIG. 3). The separator body is suspended in the chasm 133 via the metal straps 125a, 125b and remains free from contact with the first platform.

The second platform is connected to the first platform. The four legs 136a–d axially space apart the second platform support 43a, 43b and the separator body so that the second platform support is vertically above, and free of contact with, the separator body. Each of the four legs is disposed over a corresponding flange and connected to a corresponding flange. The four legs remain free from contact with the separator body. The legs prevent said second platform support 43a, 43b from producing a load on said separator body.

The air end 25 is disposed over the second level 43b of the second platform support and connected thereto. The air end has a shaft 147. The shaft is transverse to the back 138. The shaft is transverse to the longitudinal length of the hollow. The shaft extends through the first opening 139 of the back.

The motor 24 is disposed over the first level 43a of the second platform support and connected thereto. A shaft 148 of the motor extends through the second opening 140 of the back. The shaft 148 is transverse to the back.

The plate 141 is connected to the second platform support and is disposed between the motor and the second platform support.

A guard 149 is connected to the back. The guard covers the first and second openings of the back. The guard covers a coupling 151 (FIG. 4) which operatively connects the motor to the air end.

Figure 6:
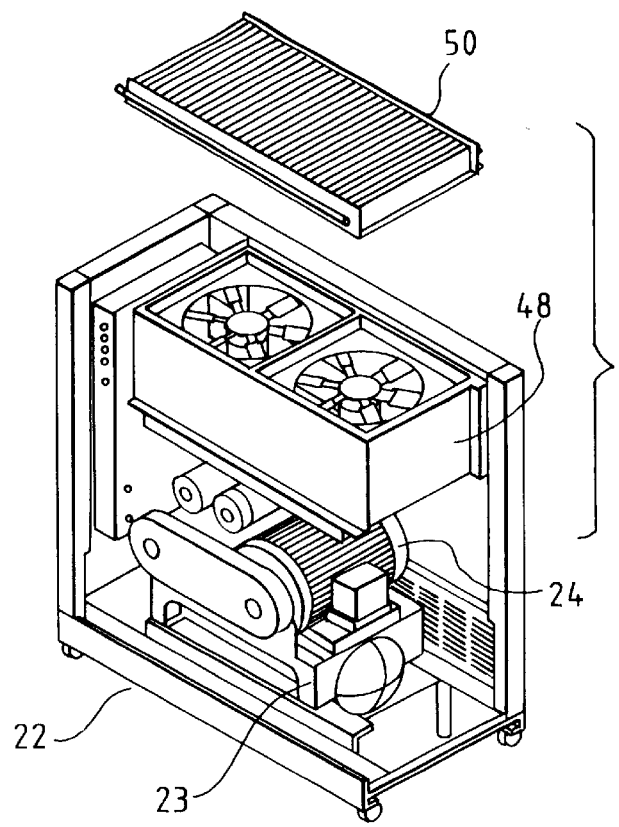
FIG. 6 is a top side perspective view of the water-injected rotary-screw air-compressor having a portion of the compressor's acoustic housing removed.

Referring to FIGS. 4, 6, and 9, the cooler fan assembly 26 is verticaly above and spatially separated from the air end and motor. The fan blades and fan motor are disposed completely within the shroud. A coupling 153 connects the fan motor to the shroud. The first heat exchanger 50 is disposed vertically above and opposite the second heat exchanger 52.

The shroud defines an air passageway. The passageway has a constriction 155. The fan blades and fan motor are disposed in the air passageway. The fan sucks air through the aftercooler 52 and blows it through the water cooler 50. The cooler fan assembly is connected to the separator.

Figure 7:
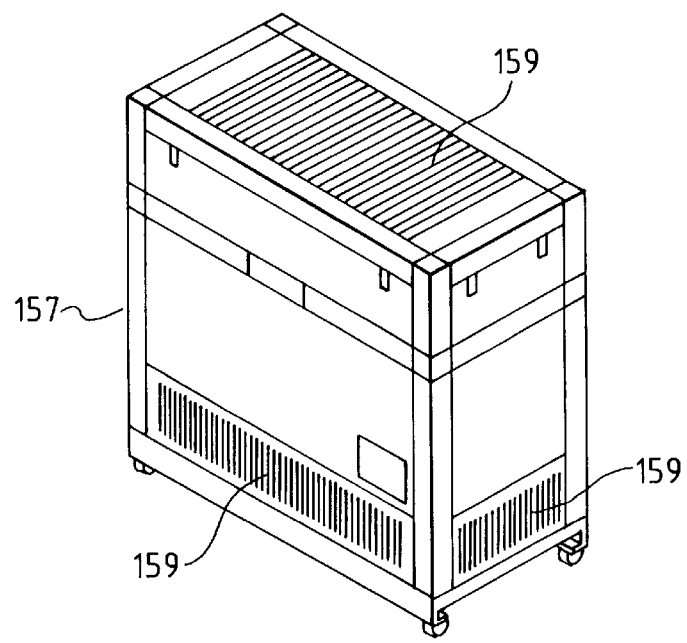
FIG. 7 is a top side perspective view of the water-injected rotary-screw air-compressor enclosed in an acoustic housing.
Figure 10:
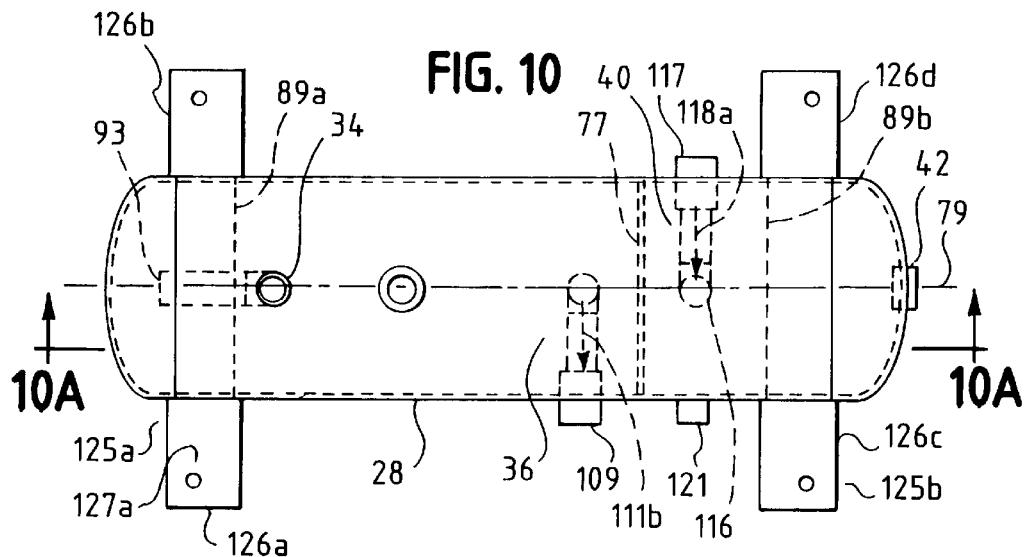
FIG. 10 is a top view of the separator.
Figure 10A:
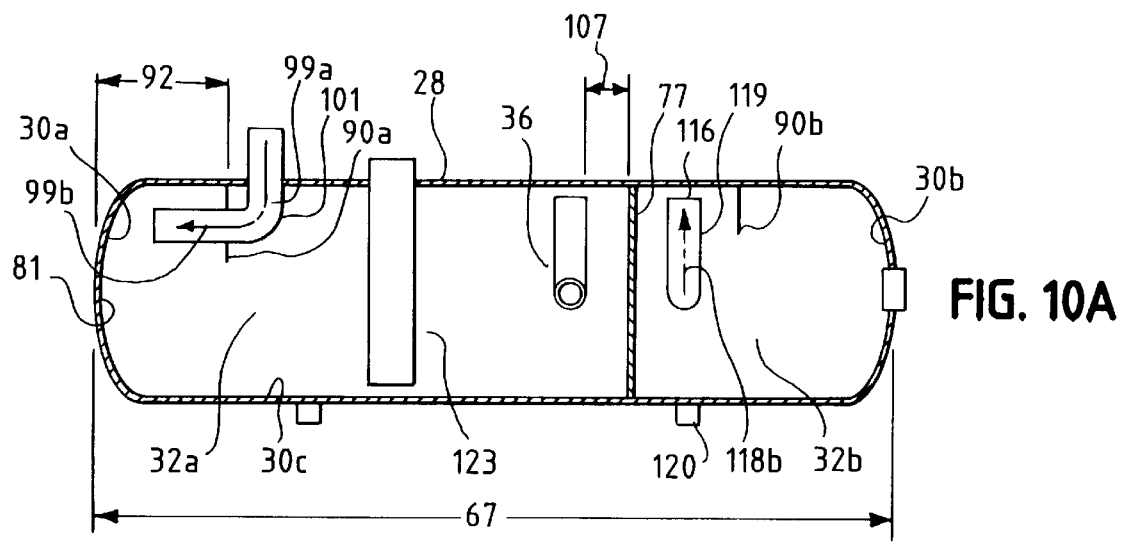
FIG. 10a is a sectional view of the separator taken along view line 10a—10a of FIG. 10.

An acoustic covering 157 (FIGS. 6, 7) forms a housing of the rotary-screw air-compressor. The housing has a plurality of air vents 159.

FIG. 1 shows a schematic illustration of the preferred manner in which the various compressor parts are joined together which have been described in some detail above. A parts list is hereinafter set forth to provide guidance.

| 24 | Motor |
|---|---|
| 25 | Air End |
| 28 | Separator Body |
| 50 | First Heat Exchanger |
| 52 | Second Heat Exchanger |
| 54a, 54b | Pair of Cooler Fans |
| 121 | Vent to Moisture Trap |
| 122 | Moisture Trap |
| 160 | Oil Reservoir Fill |
| 161 | Oil Level Sight Glass |
| 163 | Oil Reservoir Drain |
| 164 | Inlet Bearing Grease Fitting (2 places) |

-continued

| 165 | Air Inlet Valve |
|---|---|
| 166 | Air Filter |
| 167 | System Water Filter |
| 168 | Make-up Water Filter |
| 170 | Magnetic Unloaded Solenoid Valve |
| 171 | Control Check Valve |
| 172 | Muffler |
| 173 | Blowdown Solenoid Valve |
| 174 | Pressure Regulator |
| 175 | Air Line Filter |
| 176 | Shuttle Valve |
| 177 | System Pressure Transducer |
| 178 | Reservoir Pressure Transducer |
| 179 | Injection Water Transducer |
| 180 | Air Filter Vacuum Switch |
| 181 | Water Injection Manifold |
| 182 | Pressure Relief Valve |
| 183 | Separator Level Switch |
| 184 | Discharge Check Valve |
| 186 | Water Inlet Solenoid Valve |
| 187 | Globe Valve |
| 188 | Auto Drain Solenoid Valve |
| 189 | Manual Drain Globe Valve |
| 190 | Check Valve |
| 191 | Check Valve |
| 192 | Purge Valve |
| 193 | Water Treatment Housing and Cartridge |

Applicant's separator and mounting apparatus have several advantages. Previous compressors required an individual moisture separating unit and an individual separator. The moisture separating units used complex baffling structures or cyclone structures within their housings. These moisture separators provided a negligible amount of air reservoir space.

Applicant's separator eliminates the need for the previously used moisture separating units. Applicant's separator performs the moisture separating function. The single separator can be manufactured more cheaply than having to manufacture both a previous coolant separating unit and a previous moisture separating unit.

The separator performs moisture separation without reducing the overall reservoir capacity from previous coolant separating units.

The separator mounting apparatus helps to reduce the surface area taken up by the compressor. The mounting apparatus vertically elevates the motor and the air end over the separator. The vertical stacking reduces the horizontal surface area taken up by a rotary-screw air-compressor.

The apparatus reduces the load and vibrational impact the motor and air end place on the separator body. The separator body is suspended in the chasm of the first platform. The motor and air end are disposed over and connected to the second platform support.

The second platform supports the air end and motor vertically above and apart from the separator body. The apparatus thus helps to isolate the separator body from vibrations caused by the motor and air end. In addition, the apparatus ensures that the motor and air end do not create a load on the separator.

Reducing the load and vibrational impact on the separator allows the separator to be made more cost effectively. The separator does not require previously used structural supports.

It is important to note that the present invention has been described with reference to an example of an embodiment of the invention. It would be apparent to those skilled in the art that a person understanding this invention may conceive of changes or other embodiments or variations which utilize the principles of the invention without departing from the broader spirit and scope of the invention as set forth in the appended claims. All are considered within the spirit and scope of the invention. The specifications and drawings are therefore to be regarded in an illustrative rather than a restrictive sense. Accordingly, it is not intended that the invention be limited except as may be necessary in view of the appended claims.

We claim:

1. A water-injected rotary-screw air-compressor separator comprising:

a separator body;

an internal surface of said separator body defining a hallow;

a partition dividing the hallow into a first chamber and a second chamber;

a first baffle in first chamber;

a second baffle in a second chamber;

a discharge inlet opening into said first chamber, said discharge inlet permits an amount of compressed air and an amount of coolant discharged from an air end to enter into said first chamber;

a coolant outlet opening out of the first chamber, said coolant outlet permits the coolant to exit said first chamber;

a compressed air outlet opening out of the first chamber, said compressed air outlet permits compressed air to leave the first chamber;

a compressed air inlet opening into said second chamber, said compressed air inlet permits compressed air from said first chamber to enter said second chamber;

a compressed air discharge outlet opening out of said second chamber;

a moisture outlet opening out of said second chamber.

2. The water-injected rotary-screw air-compressor separator of claim 1 further comprising:

means to direct the amount of compressed air and the amount of coolant discharged in a flow direction in the first chamber, said means disposed in said first chamber;

said flow direction includes a first and a second flow direction, the first flow direction flows in a different direction than the second flow direction, said first and second flow directions being inside said first chamber;

means to direct the compressed air in a flow direction in the second chamber, said means disposed in said second chamber;

said flow direction in the second chamber includes a first and a second flow direction, the first flow direction flows in a different direction than the second flow direction, said first and second flow directions being inside said second chamber.

3. The water-injected rotary-screw air-compressor separator of claim 1 wherein:

said separator body has a first longitudinal section and a second longitudinal, each section being on opposite sides of a cross-sectional plane taken along a longitudinal length of the hollow;

an entrance and exit are formed by said discharge inlet;

an entrance and exit are formed by said compressed air inlet;

said exit of said discharge inlet is disposed within said first chamber and said first longitudinal section, and said exit of said discharge inlet is disposed between the first baffle and a first end of the separator body, and wherein;

said exit of the compressed air inlet is disposed within the second chamber and the first longitudinal section, said exit is disposed between the second baffle and the partition.

4. The water-injected rotary-screw air-compressor separator of claim 1 wherein:

the first baffle has a curved edge forming an arc, the curved edge has a first end and a second end;

the second baffle has a curved edge forming an arc, the curved edge has a first end and a second end;

the first baffle has a linear edge, the linear edge has ends which form the first and second ends of the curved edge of the first baffle;

the second baffle has a linear edge, the linear edge has ends which form the first and second ends of the curved edge of the second baffle.

5. The water-injected rotary-screw air-compressor separator of claim 2 wherein:

said means to direct the coolant and compressed air discharge in a flow direction in the first chamber has a tube within said first chamber, and wherein;

said means to direct the compressed air in a flow direction in the second chamber has a tube within the second chamber.

6. The water-injected rotary-screw air-compressor separator of claim 2 wherein:

the first flow direction in the first chamber flows away from a second end and towards the first end of the separator body, and wherein;

the first flow direction in the second chamber is transverse to a longitudinal length of the hollow and flows away from a second longitudinal section towards a first longitudinal section of the separator body.

7. The water-injected rotary-screw air-compressor separator of claim 6 wherein:

the second flow direction in the first chamber is transverse to the longitudinal length of the hollow and flows from the first longitudinal section towards the second longitudinal section, and wherein;

the second flow direction in the second chamber is transverse to the longitudinal length of the hollow and moves away from the internal surface and towards an interior of the hollow.

8. A water-injected rotary-screw air-compressor comprising:

a first platform;

a separator having a separator body, said separator connected to said first platform;

a second platform having a second platform support, said second platform connected to said first platform, said second platform support vertically above said separator body;

an air end connected to means to power said air end, said air end and said means to power disposed over said second platform support and connected thereto, said air end connected to said separator;

means to prevent said second platform support from producing a load on said separator body;

an internal surface of said separator body defining a hollow;

a partition dividing the hollow into a first chamber and a second chamber;

a first baffle in said first chamber;

a second baffle in said second chamber;

a discharge inlet opening into said first chamber, said discharge inlet permits an amount of compressed air and an amount of coolant discharged from said air end to enter into said first chamber;

a coolant outlet opening out of the first chamber, said coolant outlet permits the coolant to exit said first chamber;

a compressed air outlet opening out of the first chamber, said compressed air outlet permits compressed air to leave the first chamber;

a compressed air inlet opening into said second chamber, said compressed air inlet permits compressed air from said first chamber to enter said second chamber.

9. The water-injected rotary-screw air-compressor of claim 8 further comprising:

a cooler fan assembly fluidly connected to said separator, said cooler fan assembly vertically above said air end.

10. The water-injected rotary-screw air-compressor of claim 9 wherein said cooler fan assembly further comprises:

a shroud having a first end opposite a second end, said shroud defining an air passage, said air passage having a constriction;

a liquid-coolant heat exchanger connected to said shroud, said liquid-coolant heat exchanger for liquid-coolant;

a compressed air heat exchanger for receiving compressed air connected to said shroud, said liquid-coolant heat exchanger and said compressed air heat exchanger opposite each other;

at least one fan disposed completely within the shroud and between the liquid-coolant heat exchanger and the compressed air heat exchanger, said one fan has a motor and a fan blade wherein;

said fan produces an air flow, said liquid-coolant heat exchanger and said compressed air heat exchanger are in a path of said air flow, wherein;

compressed air received by said compressed air heat exchanger is received without passing through the liquid-coolant heat exchanger, and wherein;

liquid-coolant received by the liquid-coolant heat exchanger is recirculated through the liquid-coolant heat exchanger without passing through the compressed air heat exchanger.

* * * * *